3,354,208
PREPARATION OF ACRYLAMIDE
Richard Parke Welcher, Old Greenwich, Conn., assignor to American Cyanamid Company, Stamford, Conn., a corporation of Maine
No Drawing. Filed Aug. 20, 1964, Ser. No. 391,006
3 Claims. (Cl. 260—561)

ABSTRACT OF THE DISCLOSURE

Process for preparing acrylamide by the continuous pyrolysis of 2-acetoxypropionamide at 400° C.–600° C. and atmospheric or sub-atmospheric pressures.

This invention relates to a process for preparing acrylamide. More particularly, it relates to a process for preparing acrylamide from 2-acetoxypropionamide.

Acrylamide and its polymerization and copolymerization products are of recognized importance in various fields. Particularly, these products have been found to be useful in the fields of adhesives, dispersants, plasticizers, surface coatings, and thickening agents as well as in the leather, paper, rubber, textile, and photographic arts.

It will be appreciated that the art is desirous of alternate routes for the preparation of acrylamide in order to lower the cost of production as well as the cost of the ultimate acrylamide containing products. In the preparation of acrylonitrile an important side product is lactonitrile. Various products have been prepared from this side product including 2-acetoxypropionamide (see for example U.S. Patent 2,459,686 to Davis). However, so far as is known, no route has been proposed from 2-acetoxypropionamide to acrylamide. U.S. Patent 2,494,583 to Ratchford et al. discloses a method for preparing N,N - dimethylacrylamide by the thermodecomposition of N,N-dimethyl-$\alpha$-acetoxypropionamide at about 476° C. to 559° C. Although the method of this patent is suitable for the preparation of N-alkyl acrylamides from the corresponding N-alkyl - 2 - acetoxypropionamide, the same process cannot be applied to the preparation of acrylamide from 2-acetoxypropionamide. While the exact mechanistic reasons for this difference in behavior are unknown, it is thought that the N-alkyl moiety of the acetoxypropionamide intermediate acts to prevent dehydration of the amide to the nitrile, thereby stabilizing the N-alkyl acrylamide, when formed, against the polymerization to which the more sensitive acrylamide reaction mixture is subject. In the illustrative examples which follow, the impossibility of preparing acrylamide by the Ratchford et al. procedure is demonstrated.

It is the principal object of this invention to provide a process by which acrylamide may be prepared from 2-acetoxypropionamide. A further object of this invention is to provide a process for preparing acrylamide which avoids the difficulties of prior art methods, particularly the polymerization of acrylamide as it is formed. A further object of this invention is to provide a process for preparing acrylamide from 2-acetoxypropionamide which is convenient and continuous. These and other objects will become apparent from the discussion and examples which follow.

In accordance with this invention it has now been found that acrylamide may be conveniently prepared by continuously pyrolyzing 2-acetoxypropionamide, separating the resultant acrylamide product as it is formed, and recycling unpyrolyzed 2-acetoxypropionamide for repeated pyrolysis. Any apparatus suitable for continuous pyrolysis and separation will be suitable. More particularly, the apparatus described by K. L. Williamson et al., J. Org. Chem., 27, 1612 (1962), and the continuous reactor described by C. F. H. Allen et al., J. Chem. Ed., 32, 394 (1955), will be suitable. The essential features of the apparatus are a vertical pyrolysis column packed with glass helices, Berl saddles or the like, extending into a reaction vessel having a side arm vapor trap to permit the return of unvolatilized liquid from above the pyrolysis column. A fractionating column is disposed on top of the pyrolysis column for continuous separation of the more volatile pyrolysis products. The more volatile pyrolysis products will contain acrylamide and acetic acid and these products may be passed into a distillation attachment for final separation. Suitable heating means such as an electric or gas furnace, or electrical heating tape, suitably insulated with glass wool may be employed for maintaining the fractionating column at the proper fractionating temperature and the system may be provided with the conventional thermometers, thermocouples and vacuum system.

A pyrolysis temperature of from about 400° C. to 600° C., preferably from about 450° C. to 550° C., will be suitable over pressures ranging from about atmospheric to about 0.1 mm. and preferably below about 10 mm. Generally, the process involves evacuating the system to the desired pressure and heating the 2-acetoxypropionamide to the desired pyrolysis temperature. Heating may be conventionally effected by means such as an electric mantle or hot liquid bath. A bath temperature of from about 160° C. to 180° C. will promote steady passage of the 2-acetoxypropionamide into the pyrolysis column.

Upon thermodecomposition in the pyrolysis column the products pass upward into the fractionation column wherein the more volatile acrylamide and acetic acid components are removed and subsequently further separated by distillation. Fractionating temperature will depend on the pressure but generally about 5 to 75 degrees higher than the boiling point of acrylamide at a given pressure will be adequate. The unpyrolyzed higher boiling reaction mixture slowly and continuously flows down the sides of the fractionating column through a return tube positioned just above the pyrolysis column into the reaction vessel. In this manner the 2-acetoxypropionamide is continuously pyrolyzed and separated into the desired acrylamide product, and the unpyrolyzed starting material and high boiling side products are returned to the reaction vessel to avoid contamination of the acrylamide product.

An extremely short contact time will effect pyrolysis of the 2-acetoxypropionamide. Thus the contact time has been calculated to range from about 0.001 to 0.01 seconds. The overall reaction time for continuous pyrolysis and separation will depend on the quantity of 2-acetoxypropionamide starting material. It will be obvious that contact time and total reaction time are a function of the quantity of starting material, the design and capacity of the reaction vessel and the pyrolysis and fractionating columns, as well as the operating temperature and pressure, and may be varied accordingly.

Conventional polymerization inhibitors may be employed in the process of this invention but generally are unnecessary.

The following example illustrates the process of this invention. The example however is not to be construed as limiting the scope of the invention except as set forth in the appended claims. All parts are parts by weight except as otherwise indicated.

EXAMPLE 1

A continuous pyrolysis-fractionation apparatus was constructed along the lines of that described by K. L. Williamson et al., J. Org. Chem. 27, 1612 (1962) as follows: A suitable still pot was fitted with a side arm vapor trap to permit the liquid return to enter the still directly. The pot was heated with an oil bath. The pyrolysis column was a ⅝-inch heat resistant glass tube, 16.5 inches long, packed with 10 inches of 4.5 mm. heat resistant glass helices, heated by a 750-watt Multiple Unit Furnace, Hevi Duty Electric Company, Type 70, connected to a Bristol pyrometer controller. On top of the pyrolysis column there was an alembic with a side arm attached to the still pot with 8 mm. heat resistant glass tubing (and two rubber sleeves). Above the alembic was the fractionating column, a ⅝-inch heat resistant glass tube 7½ inches long, packed with 4 mm. glass beads. It was wrapped with an electrical heating tape insulated with glass wool. On top was a simple distilling head with thermometer and side-arm leading to a two-neck flask cooled in a Dry Ice-acetone bath. The other neck was connected to the vacuum system. The temperatures of the pyrolysis and fractionating columns were measured by thermocouples fastened to the outside of each column at its mid-point. With the system evacuated at 0.4–0.6 mm. pressure, and the pyrolysis column at 505–506° C., 26 g. (0.191 mole) of 2-acetoxypropionamide was pyrolyzed over a period of 6 hours. A bath temperature of 160–180° C. provided steady distillation of the 2-acetoxypropionamide into the pyrolysis column, and a slow continuous flow of liquid condensate through the return tube into the still pot (approximately 1 drop every 5 seconds). Under these conditions the fractionating column stayed at 112–120° C., and head temperature at 62–76° C. and contact time was about 0.03 seconds.

Table I below shows the composition of products.

A 6.1 g. (0.047 mole) portion of 2-acetoxypropionamide was added dropwise over a period of 15 minutes to the top of a heat resistant glass tube containing a column of ⅛-inch heat resistant glass helices. The column length was 9½ inches, the diameter ¾ inches. The column was held at 483° C. by means of a 750-watt furnace, suitably fitted with thermocouples and an automatic pyrometer control. A slow stream of nitrogen, oxygen-free, was passed through the column simultaneously as a carrier. Contact time was about 2.03 seconds. The products were collected in a cold receiver at the bottom of the pyrolysis tube and analyzed by vapor phase chromatography using conventional techniques. Pure reference compounds were used to help in the identification of the products.

The product was a mixture of acetic acid, acrylonitrile, lactonitrile, 2-acetoxypropionitrile, acetic anhydride, and unreacted 2-acetoxypropionamide. No acrylamide was found.

I claim:

1. A process for preparing acrylamide comprising continuously pyrolyzing 2-acetoxypropionamide at from about 400° C. to 600° C., separating resulting acrylamide as it is formed, and recycling unpyrolyzed 2-acetoxypropionamide.

2. A process as in claim 1 wherein pyrolysis is carried out at from about 450° C. to 550° C. at a pressure below about 10 mm.

3. A process as in claim 2 wherein the contact time is in the range of about 0.001 to about 0.03 seconds.

TABLE I.—PYROLYSIS OF 2-ACETOXYPROPIONAMIDE MATERIAL BALANCE AND COMPOSITION OF PRODUCTS

| Where Found | Compounds Identified [1] | Concentration [1] (mole percent) | Wt. (g.) | Yield [4] (percent) |
| --- | --- | --- | --- | --- |
| Vacuum trap | Water | 50 | 0.1 | 11 |
|  | Acetic acid | 50 | 0.3 | 10 |
| Receiver | Lactonitrile | 4 | 0.4 | 11 |
|  | Acrylonitrile | 4 | 0.3 | 11 |
|  | Acetic acid | 40 | 3.3 | 113 |
|  | 2-acetoxypropionitrile | 9 | 1.4 | 24 |
|  | Acrylamide | 9 | 0.9 | 25 |
|  | 2-acetoxypropionamide | 34 | 6.2 |  |
| Still pot and vapor trap |  |  | [2] 6.3 |  |
| Char and column holdup |  |  | [3] 6.8 |  |
|  |  |  | 26.0 |  |

[1] From Vapor Phase Chromatographic spectra.
[2] Including 3–4 g. of gummy solid.
[3] Figure obtained by difference.
[4] Yield is defined as follows: Yield = number of moles of specific product × 100% / number of moles of converted starting material.

COMPARATIVE EXAMPLE 2

In order to demonstrate the non-equivalence of conventional single pass processes for the pyrolysis of 2-acetoxypropionamide, such as the method disclosed in U.S. Patent 2,494,583 to Ratchford et al., the following experiment was run.

References Cited

UNITED STATES PATENTS 2,702,822   2/1955   Weisgerber _____ 260—561
2,494,583   1/1950   Ratchford et al. _____ 260—561

ALEX MAZEL, Primary Examiner.

J. A. NARCAVAGE, Assistant Examiner.